(12) United States Patent
Cazals et al.

(10) Patent No.: US 8,152,095 B2
(45) Date of Patent: Apr. 10, 2012

(54) AIRCRAFT HAVING A REDUCED ACOUSTIC SIGNATURE

(75) Inventors: Olivier Cazals, Daux (FR); Alexander Koch, Eppstein (DE)

(73) Assignee: Airbus France, Toulouse (FR)

( * ) Notice: Subject to any disclaimer, the term of this patent is extended or adjusted under 35 U.S.C. 154(b) by 795 days.

(21) Appl. No.: 12/178,704

(22) Filed: Jul. 24, 2008

(65) Prior Publication Data

US 2009/0084889 A1 Apr. 2, 2009

(30) Foreign Application Priority Data

Jul. 26, 2007 (FR) .................................... 07 05466

(51) Int. Cl.
*B64D 27/20* (2006.01)
(52) U.S. Cl. .......................................... 244/55
(58) Field of Classification Search ...................... 244/55
See application file for complete search history.

(56) References Cited

U.S. PATENT DOCUMENTS

| | | | | |
|---|---|---|---|---|
| 2,557,522 | A * | 6/1951 | Vautier | 244/74 |
| 3,576,300 | A | 4/1971 | Palfreyman | |
| 3,936,017 | A | 2/1976 | Blythe et al. | |
| 4,235,303 | A | 11/1980 | Dhoore et al. | |
| 4,767,083 | A * | 8/1988 | Koenig et al. | 244/12.3 |
| 4,924,228 | A * | 5/1990 | Novak et al. | 342/2 |
| 5,299,760 | A * | 4/1994 | Finch et al. | 244/53 B |
| 5,957,405 | A * | 9/1999 | Williams | 244/15 |
| 6,089,504 | A * | 7/2000 | Williams et al. | 244/53 B |
| 6,102,332 | A | 8/2000 | Haxton et al. | |
| 6,199,795 | B1 * | 3/2001 | Williams | 244/15 |
| 6,273,363 | B1 * | 8/2001 | Sprenger | 244/13 |
| 6,612,522 | B1 * | 9/2003 | Aldrin et al. | 244/2 |
| 6,938,854 | B2 * | 9/2005 | Nelson | 244/120 |
| 7,905,449 | B2 * | 3/2011 | Cazals et al. | 244/55 |
| 2003/0146344 | A1 * | 8/2003 | Saito et al. | 244/55 |
| 2003/0168552 | A1 * | 9/2003 | Brown | 244/55 |
| 2005/0178890 | A1 * | 8/2005 | Bacon | 244/55 |

(Continued)

FOREIGN PATENT DOCUMENTS

EP 1616786 A 1/2006

(Continued)

OTHER PUBLICATIONS

French Search Report dated Feb. 27, 2008.

*Primary Examiner* — Timothy D Collins
*Assistant Examiner* — Joseph W Sanderson
(74) *Attorney, Agent, or Firm* — Perman & Green, LLP (57) ABSTRACT

An aircraft, the propulsive units of which include engines, and which is distinguished by reduced noise emissions, includes a wing structure fixed to an upper region of the fuselage, and a vertical tail system having at least two vertical stabilizers which are generally vertically fixed to the fuselage aftwardly of the wing structure. The engines are disposed side by side in a propulsive package disposed above the fuselage, which propulsive package includes the following: air inlet openings for the propulsive package, which openings are disposed above the fuselage between a point at the leading edge and a point at the trailing edge of an aerodynamic root chord of the wing structure; and exhaust nozzle conduit outlets associated with exhaust nozzle conduits, which outlets are formed by the structure (cowling structure) of the propulsive package, and are disposed above the fuselage forwardly of an aft terminus of the fuselage and between the vertical stabilizers.

8 Claims, 5 Drawing Sheets

U.S. PATENT DOCUMENTS

2006/0011779 A1 * 1/2006 Cazals et al. .................... 244/54

FOREIGN PATENT DOCUMENTS

| FR | 2915459 | A1 * | 10/2008 |
| FR | 2915460 | A1 * | 10/2008 |
| GB | 1243392 | A | 8/1971 |
| GB | 1397068 | A | 6/1975 |
| GB | 1463810 | A | 2/1977 |
| GB | 2428414 | A | 1/2007 |

* cited by examiner

AIRCRAFT HAVING A REDUCED ACOUSTIC SIGNATURE

The disclosed embodiments relate to the area of aircraft technology, particularly aircraft intended to take off and land from/onto runways in urban environments.

In particular, the disclosed embodiments relate to aircraft in civil aviation, wherewith it is proposed that an aircraft having an appropriate configuration of fuselage, various aerodynamic surfaces, and propulsion units, can achieve particularly low noise levels, favoring its use where noise control rules militate against the use of aircraft of conventional architecture, eg use in urban areas.

BACKGROUND

Environmental considerations, particularly the burden of noise pollution to persons in the vicinity of airports when aircraft take off and land, are critical for the right to operate for some airports located in heavily urban areas, where the balance of convenience to the users of the airport is yielding to the objections of the persons exposed to the noise.

In aircraft design engineering, therefore, the search for solutions providing lower noise levels is a constant challenge.

The principal sources of aircraft noise affecting airport environments are generally:
  aerodynamic noise in the approach phase, particularly aerodynamic noise generated by high lift enhancing devices and landing gear; and
  noise from propulsion units, particularly during takeoff phases, and particularly in the case of high speed aircraft.

Numerous attempts have been made to devise means for reduction of aerodynamic noise, and to design engines and engine housings (nacelles and other cowling structures) which are intrinsically less noisy.

Attempts to reduce aerodynamic noise by simplifying high lift systems: trailing edge flaps and leading edge slats, are limited by the need for high lift coefficients.

Modern jet aircraft have engines which are, inter alia, less noisy. These engines are of the "turbofan" type, and employ very high dilution, generally greater than 5, which reduces the mean jet velocity of the engine and thereby the noise generated.

Such engines also have low noise nacelles and exhaust nozzles. Eg a forwardly elongated nacelle has the effect of "masking" the noise radiated and propagated from air intake, at least in the direction of the ground. Also (or alternatively), such engines tend to mix core flow and fan air flow, eg with the use of suitable nozzles, which achieves noise reduction in that the core flow is the chief generator of noise.

However, the reduction in noise level which is obtained is often at the cost of increased engine complexity, increased weight, and decreased propulsive efficiency of the propulsive system, which can limit the feasibility of some solutions; moreover, the known solutions are still insufficient to meet future low noise requirements.

Another solution for reducing the noise impact on the ground of aircraft in flight involves locating the engines such that noise radiated from the air intakes and exhaust nozzles are stopped by certain surfaces defined by structures of the aircraft.

In this connection, it has been proposed to mount the engines on the upper surface of the wing structure, achieved with the use of conventional engine nacelles mounted with the aid of vertical pylons which extend between the respective engines and the top surface of the wing structure.

With such an arrangement, the wing surfaces forwardly of and also laterally of the engine air intakes create a barrier which limits propagation of noise toward the bottom of the aircraft and thus toward the ground, when the aircraft is in flight. However, such positioning of the engines where conventional engine nacelles are employed is not sufficient to significantly reduce emitted and propagated noise, particularly toward the rear.

Solutions of the type described above have only rarely been implemented in practice on aircraft.

SUMMARY

According to the disclosed embodiments, it is proposed to employ an aircraft architecture which is optimized to substantially reduce the noise emitted by the engines and to form a barrier to the noise so emitted so that it is minimally propagated to the ground.

The proposed low noise aircraft has the following features of conventional aircraft: a fuselage, a wing structure fixed to the fuselage, at least one horizontal stabilizer, a vertical tail system, and one or more propulsion jet engines.

To provide an optimum barrier against radiation and propagation of acoustic waves toward the ground when the aircraft is in flight, without the addition of specific devices, the configuration and arrangement of the wing structure, the vertical tail system, and the one or more propulsion jet engines, with respect to the fuselage, are such that:
  The wing structure is fixed to the fuselage in an upper portion of said fuselage;
  The vertical tail system comprises at least two vertical stabilizers, which are substantially vertical and mounted on the fuselage aft of the wing structure.

One or more propulsion jet engines are provided in a propulsive system disposed above the fuselage, the propulsion jet engines being disposed side by side in said propulsive system when at least two propulsion jet engines are provided, which propulsive system comprises:
  air intake openings for said propulsion jet engine(s), which air intakes are formed by a cowling structure of said propulsive system, are disposed above the fuselage and, considering a longitudinal axis of the fuselage, are located between a point at the leading edge and a point at the trailing edge of an aerodynamic root chord of the wing structure; and
  exhaust nozzle conduit outlets, which exhaust conduit are formed by the cowling structure of the said propulsive system, are disposed above the fuselage forwardly of an aft terminus of said fuselage and between the vertical stabilizers.

In order to integrate the propulsive system with the fuselage, the width of the fuselage in its aftmost portion is equal to or greater than the width of the propulsive system, and the vertical stabilizers are substantially in aerodynamic continuity with lateral external walls of the cowling structure, which structure accommodates the propulsive system.

In order to obtain effective shielding sis à vis noises radiated by the engine air intakes, the air intake openings of the propulsive system are disposed above the fuselage preferably near a point with respect to the wing root chords, such that the area of the acoustic barrier created by the wing structure is maximized in light of the noise radiation and propagation diagrams for noise from the air intakes and from the leading edge sweep of the wing.

To improve the aerodynamic integration of the propulsive system, and to enhance shielding against radiation and propagation of noise coming from the engine air intakes, the engines are installed in a sunken position, such that at least 10%, advantageously about 30%, of the diameter of each engine is disposed below the upper delimiting surface of the fuselage.

To improve the noise reduction at the front and rear of the engines, at least a portion of the interior surfaces of the cowling structure of the propulsive system, from air intakes and exhaust nozzles of the propulsive system, have means for absorption of acoustic waves.

To provide an effective barrier against noise emitted by the exhaust nozzles, the exhaust nozzle outlets, formed by the cowling structure of the propulsive system, are aft of the leading edges of the vertical stabilizers and forwardly of the trailing edges of said vertical stabilizers.

Advantageously, the relatively large length of the propulsive system allows the engines to be disposed in a more or less aftward location, without degrading the performance of the proposed configuration, wherewith, with respect to the longitudinal axis of the fuselage, such that zones of ejection of scraps will not involve zones of the wing structure or of the stabilizers where organs, which are important for the safety of the aircraft, are disposed.

Taking advantage of the width of the fuselage in the zone of the propulsive system, the engines are suspended under a part of the cowling structure which is fixed with respect to the fuselage, and are disposed above maintenance shafts which go across an aft portion of the fuselage, which shafts generally extend vertically with respect to said engines. These maintenance shafts facilitate raising and lowering of the engines at times when the engines are being mounted or dropped off.

Advantageously, the fixed part of the cowling structure of the propulsive system comprises one or more separation walls between the engines, which walls extend aftwardly from a zone of the air intake to a zone of the exhaust nozzle, so as to provide appropriate shielding suitable for protecting an engine from engine scraps which might be ejected from a neighboring engine. Said separation walls support hinged covers which are adapted to engine maintenance needs.

There follows a detailed description of some exemplary embodiments of the disclosed embodiments, with reference to the drawings, which are schematic illustrations.

The present description of a preferred embodiment of the disclosed embodiments is offered merely by way of example, and does not limit the scope of the disclosed embodiments.

DETAILED DESCRIPTION OF THE DRAWINGS

Figure 1:
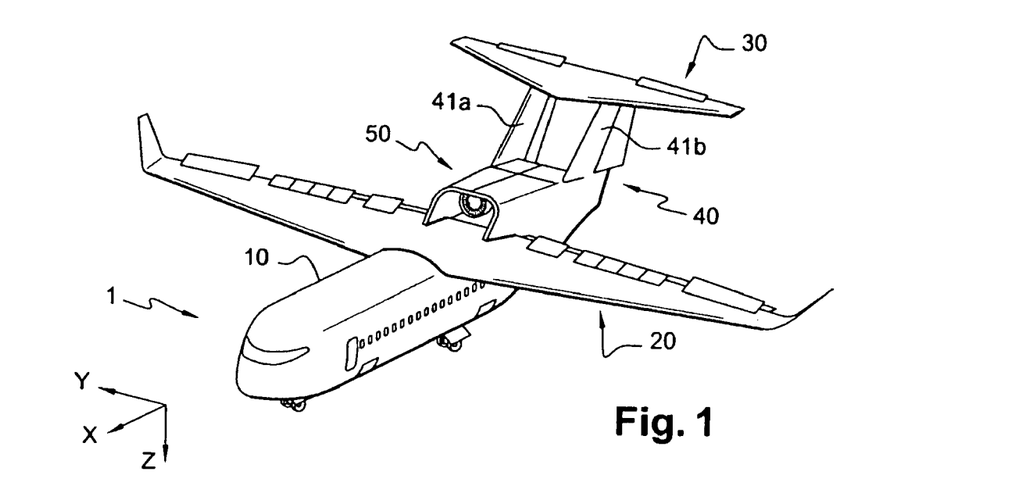
FIG. 1 is a perspective view of an aircraft of the disclosed embodiments with its landing gear extended.

As illustrated in FIG. 1 an inventive aircraft 1 is comprised of a fuselage 10, a wing structure 20, a horizontal stabilizer 30, a vertical tail system 40, and a propulsive system 50 comprising jet engines, which propulsive system 50 is mounted over an aft section of the fuselage 10.

For the purposes of description, the following conventional coordinate system will be used:

The X axis is an axis parallel to the longitudinal axis of the fuselage, and directed toward the front of the aircraft [ie the positive ray of the X axis is in the forward direction];

The Z axis is perpendicular to the X axis and parallel to a vertical plane of symmetry of the aircraft, and is directed downward;

The Y axis is perpendicular to the plane defined by the X and Z axis, and is directed toward the right hand side of the aircraft.

The lateral extent of the wing structure is thus essentially in the Y direction, the longitudinal extent of the fuselage is essentially in the X direction, and the lateral extent of the fuselage is essentially in the Y direction.

The aircraft 1 illustrated in FIGS. 1 to 4 has characteristics which together promote quietness of operation of the aircraft.

A first characteristic relates to the wing structure 20. The wing on the aircraft 1 is fixed in a high position on the fuselage in generally called high wing aircraft configuration.

A second characteristic relates to the vertical tail system 40.

Like in a conventional configuration, said vertical tail system is arranged in the aft section of the fuselage.

However, said vertical tail system has a pair of vertical stabilizers (41a, 41b) corresponding to vertical aerodynamic surfaces which are fixed substantially symmetrically with respect to a vertical plane of symmetry XZ of the fuselage and are mutually separated by a distance Yv in the Y direction.

A third characteristic relates to the horizontal stabilizer 30.

This horizontal stabilizer is a rear horizontal stabilizer, ie is disposed aft of the wing structure 20 with regard to the direction of flight of the aircraft, and consist mainly in a substantially horizontal aerodynamic surface which is fixed in a high part of the vertical stabilizers (41a, 41b).

Conventionally, the vertical stabilizers (41a, 41b) and the horizontal stabilizer 30 are provided with flight control surface, respectively, rudder control for yaw control in relation to the vertical tail, and elevator flaps for pitch control in relation to the horizontal stabilizer; preferably on the trailing edge sides of their respective stabilizer surfaces, for the control of the aircraft, particularly in flight.

A fourth characteristic relates to the propulsive system 50.

The propulsive system 50 comprises all the engines used to propel the aircraft In the example illustrated in the drawings, two propulsion jet engines (51a, 51b) are arranged in the propulsive system 50. In variant embodiments a larger number of engines is possible, eg three or more, provided that (as will be discussed infra) a constraint is imposed on:

the width of the fuselage in the zone of the propulsive system; and the distance Yv between the vertical stabilizers.

The propulsive system is disposed above the fuselage 10 between the wing 20 and the vertical tail system 40.

The propulsive system includes the propulsion jet engines, which are advantageously disposed side by side with their axes parallel, and further includes a cowling structure 52 which surrounds the engines.

This cowling structure 52 is functionally equivalent to a nacelle, with a generally barrel-like shape, around pod mounted engines attached under wings or to fuselages using pylon on conventional aircraft.

A forward part of the cowling structure correspond to air intakes 53 for the engines (51a, 51b); and an aft part of the cowling structure correspond to exhaust nozzle conduits 54 for said engines.

Between the forward border of the air intakes 53 and the aft border of the exhaust nozzle conduits 54, the cowling structure 52 defines surfaces which provide aerodynamic continuity of the shape of the propulsive system 50:

outside the propulsive system, to minimize external aerodynamic drag; and inside the propulsive system, to provide aerodynamically favorable flow patterns in front of and behind the engines, in order to ensure good operation of the engines and good propulsive efficiency. The internal configurations of the cowling structure 52 should conform to known principles for engine air intakes and engine exhaust nozzles, wherewith in particular the surfaces should be of good "surface quality", and at all points the cross sections of the conduits for said air intakes and exhaust nozzles should be adapted to the engines employed.

Advantageously, the external shape of the cowling structure 52 should be optimized to minimize fuselage drag.

The said external shape evolves progressively from the forward border of the air intakes 53, in the respect of aerodynamic constraints for a good functioning of the engine air intake system, to connect with the vertical stabilizers (41a, 41b), with lateral walls being substantially vertical and advantageously having an upper wall relatively flattened, determining an aerodynamic channel bounded vertically by said upper wall of the cowling structure and the horizontal stabilizer 30, and bounded laterally by the two vertical stabilizers, said aerodynamic channel being of a substantially constant cross section or of a cross section which varies in a controlled manner.

Compared to a conventional jet engine nacelle, the cowling structure 52 is proportionally longer in relation to the length of the engines (51a, 51b). This increased length does not induced appreciable weight penalty, because the mounting of the cowling structure above the fuselage 10 means that said cowling structure is supported over its entire length, without a cantilever structure, and without the need for reinforcement, because substantial strength and stability is contributed by the fuselage, which fuselage is already dimensioned to withstand appreciable loads.

Figure 4A:
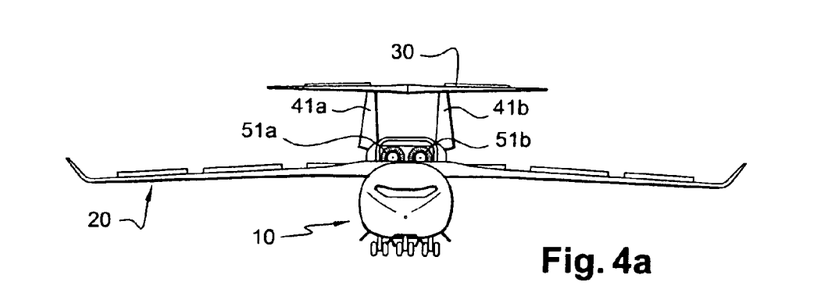
FIG. 4a is a frontal view of the aircraft of FIG. 1.
Figure 4B:
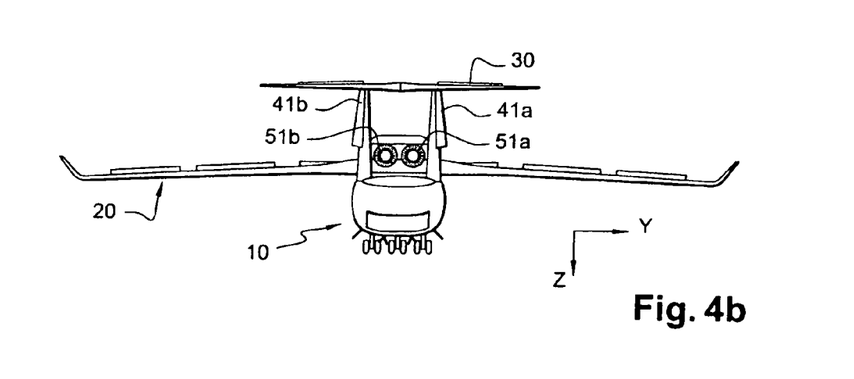
FIG. 4b is a rear view of the aircraft of FIG. 1.

According to a particularly advantageous embodiment, the engines (51a, 51b) are disposed at a lowered position on the coordinate axis Z, ie are shifted downward toward the bottom of the aircraft, such that a portion of the propulsion jet engine is disposed below a line delimiting the upper surface of the fuselage 10 as shown on FIG. 4a.

By mounting the propulsion jet engines in a lowered position on the aircraft of at least 10%, well 30%, of the diameter of the propulsion jet engine significantly reduced, thereby reducing the overall aerodynamic drag contribution of the propulsive system.

In order to compensate for the lowered position of the propulsion jet engines, the cowling structure 52 is shaped such that the air intake deviates the air in the Z direction from a zone above the fuselage to the engines, wherewith necessarily the air intake conduit has a generally "S" shape.

This particular configuration of the air intake conduit, and the shifted position of the engines, also favors radiation and propagation of the noise of the air intake in a direction opposite to the ground, and thereby contributes to reduction of the noise at ground level.

The extent of the cowling structure 52 in the forward direction (positive X direction) is delimited by the air intake openings 53 which, as seen, are disposed above the fuselage 10 and are in a zone of the fuselage which corresponds to the zone of the fuselage in which the wing 20 is attached to the fuselage.

More particularly, if one considers a wing root chord 21 corresponding to a chord located close to the fuselage, the air intake openings 53 preferably are disposed (with regard to the X axis) between a leading edge of said wing root chord and a point at trailing edge of said wing root chord.

Figure 2:
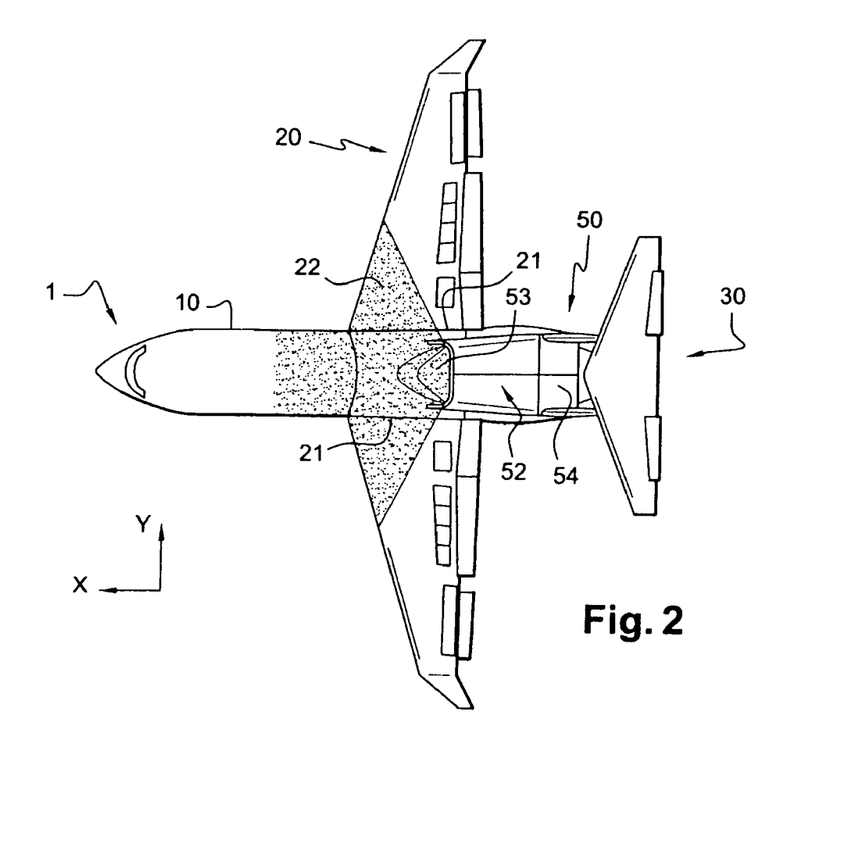
FIG. 2 is a plan view of the aircraft of FIG. 1.
Figure 3:
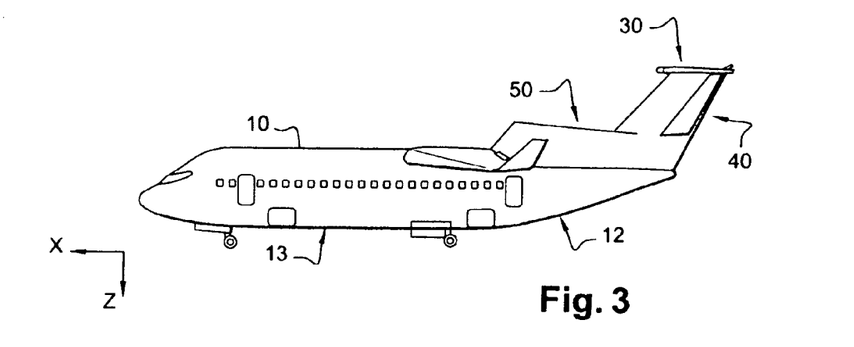
FIG. 3 is a lateral profile view of the aircraft of FIG. 1.

With these relative positions of the wing structure, the fuselage, and the air intake openings, it is seen that the combined surface above the fuselage 10 and the wing structure 20 forms a barrier 22, represented by the shaded zone in FIG. 2, which barrier limits the propagation of noise radiated by the air intakes toward the bottom of the aircraft, thus toward the ground when the aircraft is in flight.

A preferred disposition of the air intake openings of the propulsive system 50 along the longitudinal axis, with respect to the root chord 21, which intake openings are located above the fuselage, is obtained if the acoustic barrier 22 created by the wing structure 20 is maximized in light of the noise radiation and propagation diagrams for noise from the air intakes and from the leading edge sweep of the wing 20.

Advantageously, the efficiency and efficacy of the reduction in noise emitted toward the front of the engines is also improved if the following features are present:

the air intake conduits, defined by an interior surface of the cowling structure 52 disposed between the front end of said structure and an intake plane of the engines (51a, 51b), are relatively long with respect to the diameter of the engine air intakes;

the air intake conduits have acoustic absorption treatments similar to known absorption treatments used for engine air intakes, but in this case applied to a greater surface, in view of the length of these conduits;

the air intake openings themselves are inclined rearward, ie the upper lip of the air intake openings is disposed rearward from the lower lip, having the effect of blocking downward propagation of noise toward the bottom of the aircraft, and thus toward the ground, when the aircraft is in flight.

The extent of the cowling structure 52 in the aftward direction is delimited by the exhaust nozzle conduit outlets 60 (FIG. 5b), which the upper portion of the cowling structure terminates.

Figure 5A:
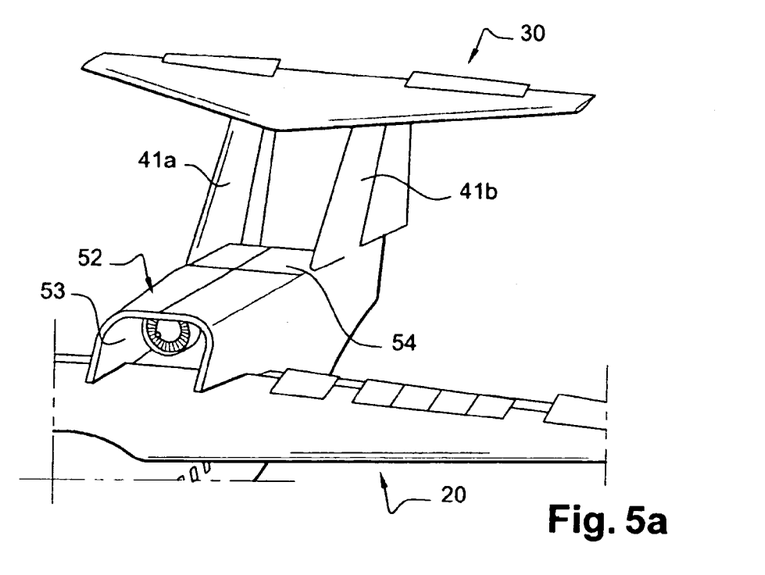
FIGS. 5a and 5b are a frontal perspective view and a rear perspective view, respectively, of details of the configuration of the aft section of the fuselage of the aircraft of the disclosed embodiments.
Figure 5B:
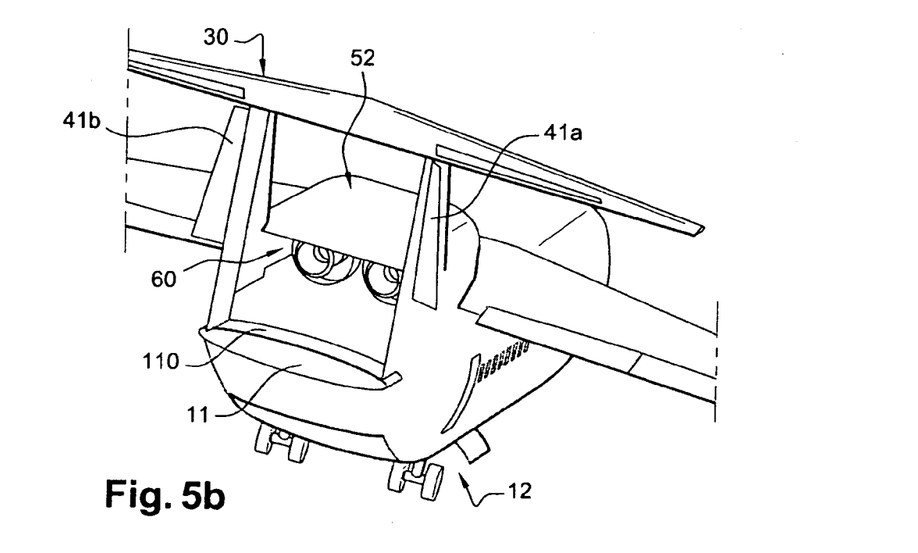

With this relationship between the cowling structure 52 and the exhaust nozzle conduit outlets 60, the cowling structure 52 has the following arrangement:

the exhaust nozzle conduit outlets 60 are disposed above the fuselage 10, forwardly of the aft terminus of the fuselage;

said exhaust nozzle conduit outlets 60 are disposed between the vertical stabilizers (41a, 41b), namely aft of the leading edges which are at the front of said vertical stabilizers and forwardly of the trailing edges which are at the aft end of said vertical stabilizers. Preferably the exhaust nozzle conduit outlets are disposed close to but nonetheless aft of said leading edges of the vertical stabilizers;

Lateral walls of the cowling structure on the outer sides of said cowling structure, parts for exhaust conduits 54, define surfaces which are in continuity with lateral surfaces of the vertical stabilizers (41a, 41b).

In such an arrangement, the exhaust conduits between the rear exhaust of the propulsion jet engines (51a, 51b) and the exhaust nozzle conduit outlets are longer than in a conventional engine nacelle; this enables better mixing of the primary and secondary streams of by-passed engines, and enables improved treatment at the internal walls of the cowling structure 52.

For the purposes of such a configuration of the propulsive system 50 and the vertical stabilizers (41a, 41b), section 12 of the fuselage 10, extending significantly from the location of the air intake opening 53 to the aft terminus 11 of the fuselage, which section at least partly comprises a zone of changing shape and cross section in which, with progression in the aft direction, cross section changes from a cross section corresponding to a substantially cylindrical fuselage section 13 flattened aft terminus (11), with the aim of limiting the aerodynamic drag of base at the aft end, and at the same time is wide system with the characteristics which will be described infra.

Thus, the width of the fuselage in the aft section 12 is at least equal to the width of the propulsive system 50, and in the zone where the vertical stabilizers (41a, 41b) are mounted said width must be at least equal to Yv, said propulsive system being conditioned by maximum widths of the engines (51a, 51b), and in addition sufficient to satisfy the structural requirements for installation of the vertical stabilizers (41a, 41b); these dimensioning considerations will depend on the technological means of assembly and on the materials utilized.

Advantageously, the width of the fuselage in the cylindrical section 13 is chosen in relation to the diameter of the propulsion jet engines and thus in relation to the width of the propulsive system 50; in connection with this, the fuselage 10 will have a substantially uniform width up to its rear end 11, in particular a width substantially equal to that of the cylindrical fuselage section 13.

According to the proposed configuration, to have an extension 110 of the fuselage and the vertical stabilizers aftward of the exhaust nozzle 60 creates an acoustic barrier against noise radiated and propagated from said exhaust nozzle.

Advantageously, the longitudinal position scrap from an engine in the event of burst will not risk damage to essential organs of the aircraft.

Figure 6:
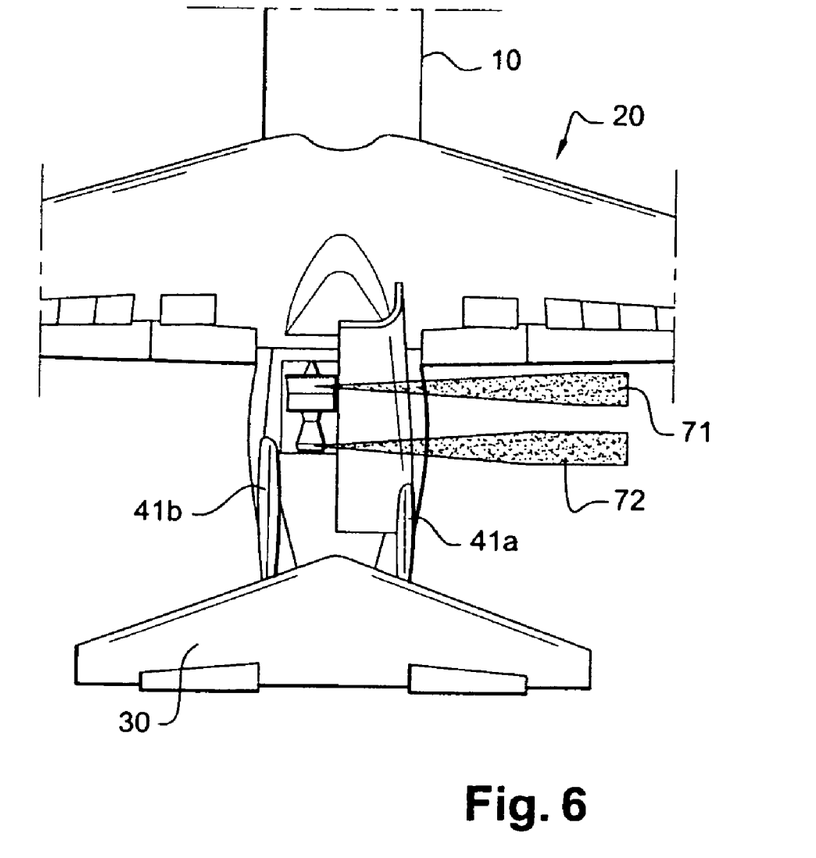
FIG. 6 is a plan view of the aft portion of the aircraft of FIG. 1, illustrating zones of potential ejection of engine scraps.

In FIG. 6, the arrangement has been chosen such that the ejection cones (71, 72) of engine scraps do not impinge elements such as flaps, roll control surfaces, yaw control surfaces, or pitch control surfaces, or internal components which if damaged might comprise flight safety.

Figure 7A:
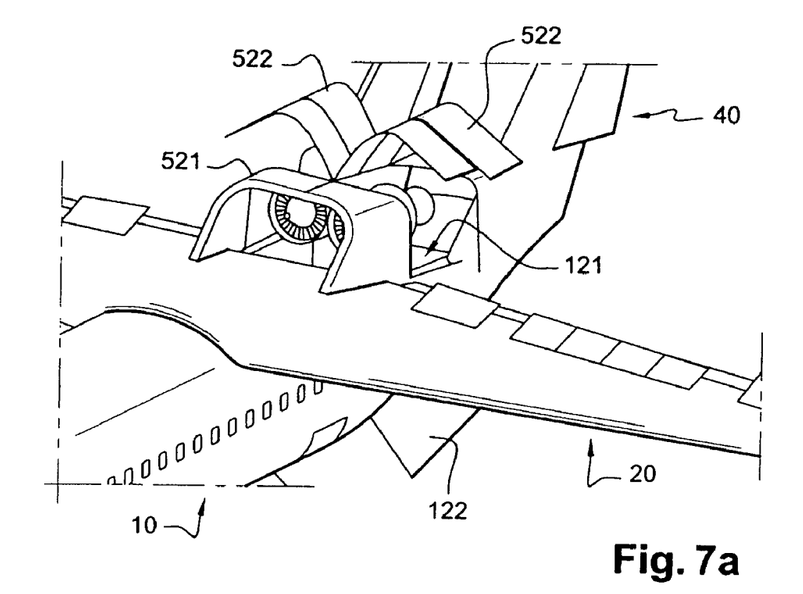
FIGS. 7a and 7b are a perspective view and a lateral profile view, respectively, of an aft portion of the aircraft of FIG. 1, illustrating the propulsion jet engines in different positions during maintenance operations on said engines.
Figure 7B:
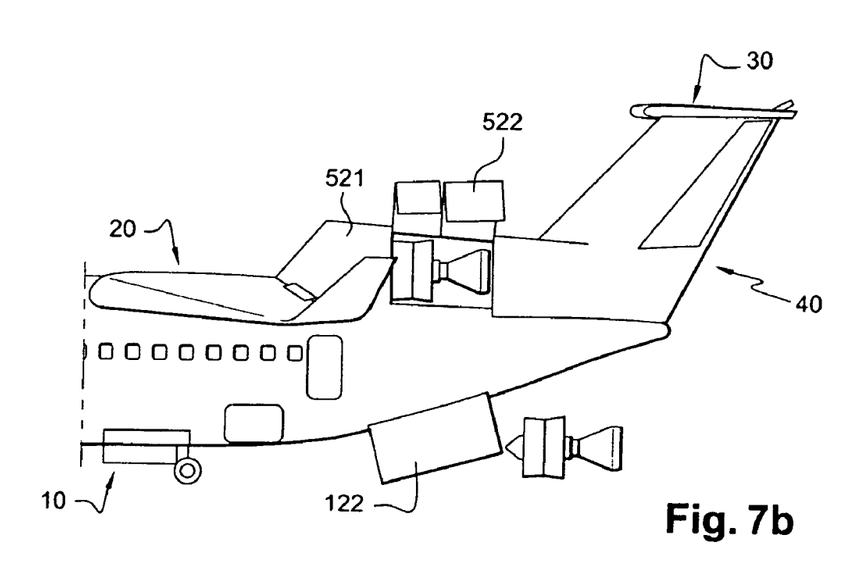

As illustrated in FIGS. 7a and 7b, to facilitate maintenance of the engines (51a, 51b), the cowling structure 52 has movable covers 522, eg hinged covers, which when opened enable access to the propulsion jet engines from above the fuselage 10, for inspection or routine maintenance.

Preferably, said movable covers 522 are hinged on one or more structural separation walls between the engines (51a, 51b) which walls are fixedly mounted on the fuselage and which extend longitudinally from a zone of the air intake to a zone of the exhaust nozzle. Advantageously, in the zones of the engines where a risk is present that scraps will be ejected from an engine in the event of engine burst, said separation walls have protective means (armoring or the like) suitable for protecting an engine from scraps which might be ejected from a neighboring engine.

Advantageously, the engines are suspended under a fixed part 521 of the cowling structure 52, which part 521 preferably is solidly attached to the structural separation walls between the engines, said mounting being via engine pylon (not shown); and vertical maintenance shafts 121 are provided in the fuselage below the engines, to install and drop off easily the engines with the aid of conventional hoist means which are fixed to the engine pylons during the maintenance operations.

When maintenance is not being performed, the maintenance shafts 121 are covered by upper and lower hatches (eg 122) which preserve the aerodynamic continuity of the fuselage.

Thus, by judicious choice of the arrangement and configuration of various essential organs of the aircraft, in particular involving the fuselage, the wing structure, the vertical tail system, the horizontal stabilizer, and the propulsive system, one achieves an aircraft which when in flight transmits substantially less noise to the ground than does a conventional aircraft.

The invention claimed is:

1. An aircraft, having: a fuselage, a wing structure fixed to the fuselage, at least one horizontal stabilizer rearward of the wing, at least two vertical stabilizers, substantially vertical, fixed to the fuselage rearward of the wing, and at least two propulsion jet engines, wherein:

the fuselage has a cylindrical fuselage section followed rearward by a fuselage section, the cross section of which is progressively flattened to have a low thickness fuselage rear end and the width of which is substantially those of the cylindrical section;

the wing is fixed to the fuselage on the top of said fuselage;

the at least two propulsion jet engines are mounted side by side on top of the fuselage, rearward of the wing, inside a cowling structure extended longitudinally above the fuselage between, in front, air inlet openings located above the fuselage at the location of wing root chords, and, on the rear, exhaust nozzle outlets located above the fuselage and forwardly of the fuselage rear end, the width of said fuselage being at least the width of said cowling structure;

the cowling structure has lateral walls, substantially vertical, one on each outer side of the cowling structure, which are substantially in aerodynamic continuity with two vertical stabilizers of the at least two vertical stabilizers, and has a substantially flat horizontal wall joining the lateral walls extending longitudinally between the air inlet openings and the exhaust nozzle outlets, said exhaust nozzle outlets being located between said two vertical stabilizers and located forward of the trailing edges of said two vertical stabilizers and aft of the leading edges of said two vertical stabilizers.

2. An aircraft according to claim 1, wherein said at least two propulsion engines are suspended under a fixed part of the cowling structure.

3. An aircraft according to claim 1, wherein each of the air intake openings is inclined rearward, wherewith an upper lip of said opening is disposed aftwardly of a lip in the base portion of said opening.

4. An aircraft according to claim 1, wherein the at least two propulsion engines are installed in a sunken position, such that 10% to 30% of the diameter of each propulsion engine is disposed below the upper delimiting surface of the fuselage.

5. An aircraft according to claim 1, wherein interior surfaces of the cowling structure of the propulsive package, which interior surfaces extend inside air inlets and exhaust nozzles of said propulsive package, have treatment to absorb acoustic waves.

6. An aircraft according to claim 1, wherein the at least one horizontal stabilizer has a substantially horizontal aerodynamic surface which is fixed to an upper portion of the two vertical stabilizers.

7. An aircraft according to claim 1, wherein the at least two propulsion engines are disposed at a locus with respect to the longitudinal axis of the fuselage, such that zones of ejection of scraps from propulsion engines will not involve zones of the wing structure or of the stabilizers where organs which are important for the safety of the aircraft are disposed.

8. An aircraft according to claim 1, wherein said at least two propulsion engines are suspended under a fixed part of the cowling structure above maintenance shafts which traverse an aft portion of the fuselage, which shafts generally extend vertically with respect to said propulsion engines.

* * * * *